(12) United States Patent
Kaas

(10) Patent No.: US 10,415,626 B2
(45) Date of Patent: Sep. 17, 2019

(54) FASTENER ARRANGEMENT

(71) Applicant: Bossard AG, Zug (CH)

(72) Inventor: Michael Kaas, Waterloo, IA (US)

(73) Assignee: Bossard AG, Zug (CH)

( * ) Notice: Subject to any disclaimer, the term of this patent is extended or adjusted under 35 U.S.C. 154(b) by 535 days.

(21) Appl. No.: 14/733,061

(22) Filed: Jun. 8, 2015

(65) Prior Publication Data

US 2016/0356302 A1    Dec. 8, 2016

(51) Int. Cl.
| | |
|---|---|
| F16B 43/00 | (2006.01) |
| F16B 39/26 | (2006.01) |
| B23P 11/00 | (2006.01) |
| F16B 33/00 | (2006.01) |
| F16B 41/00 | (2006.01) |

(52) U.S. Cl.
CPC .............. *F16B 39/26* (2013.01); *B23P 11/00* (2013.01); *F16B 33/008* (2013.01); *F16B 41/002* (2013.01)

(58) Field of Classification Search
CPC ....................................................... F16B 39/26
USPC .......................................................... 411/533
See application file for complete search history.

(56) References Cited

U.S. PATENT DOCUMENTS

| | | | | |
|---|---|---|---|---|
| 2,779,375 A | * | 1/1957 | O'Connor ............... | F16B 39/26 411/134 |
| 3,978,761 A | * | 9/1976 | Sosinski ............... | F16B 31/021 411/5 |
| 5,332,348 A | * | 7/1994 | Lemelson ............ | B23D 61/185 411/157 |

(Continued)

FOREIGN PATENT DOCUMENTS

| | | |
|---|---|---|
| DE | 20301402 U1 | 4/2003 |
| EP | 1152479 A1 | 11/2001 |

(Continued)

OTHER PUBLICATIONS

Search Report for European Patent Application No. 16001128.4, dated Nov. 2, 2016.

*Primary Examiner* — Gary W Estremsky
(74) *Attorney, Agent, or Firm* — Marshall, Gerstein & Borun LLP

(57) ABSTRACT

A fastener arrangement comprising a main body having a driving head, a central bore with an inner thread opening out into a front face of the driving head, and a collar, axially protruding from the front face of the driving head and being coaxially arranged to the inner thread. The fastener arrangement further comprises a spring element axially abutting against the front face of the driving head having a central through hole which is coaxially arranged to the inner thread of the driving head and a bearing element axially abutting against the spring element having a central through hole which is coaxially arranged to the inner thread of the driving head. The collar axially protrudes through the through hole of the spring element and into the through hole of the bearing element, and wherein the collar at its end facing away from the driving head, which end is positioned inside the through hole of the bearing element, provides a locking section radially extending outwardly. The locking section engages into an undercut in the through hole of the bearing element in such a manner that a positive locking in axial direction is established between the collar and the bearing element.

15 Claims, 1 Drawing Sheet

(56) References Cited

U.S. PATENT DOCUMENTS

| | | | |
|---|---|---|---|
| 5,618,145 A * | 4/1997 | Kuo | F16B 21/186 411/368 |
| 5,653,481 A * | 8/1997 | Alderman | F16B 31/04 24/279 |
| 5,827,025 A | 10/1998 | Henriksen | |
| 5,941,654 A | 8/1999 | Chauquet | |
| 5,975,821 A * | 11/1999 | Kue | F16B 43/00 411/526 |
| 6,712,631 B1 * | 3/2004 | Youtsey | H01R 13/6277 439/322 |
| 7,635,243 B2 * | 12/2009 | Turner | F16B 31/028 411/10 |
| 8,142,124 B2 * | 3/2012 | Kulesha | F16B 41/002 411/149 |
| 8,967,932 B2 * | 3/2015 | Dionne | F16B 39/26 411/313 |
| 2002/0136617 A1 * | 9/2002 | Imahigashi | H01Q 1/1214 411/533 |
| 2007/0098524 A1 * | 5/2007 | Dunlap | F16B 37/00 411/533 |
| 2015/0030412 A1 * | 1/2015 | Hughes | F16B 39/26 411/262 |

FOREIGN PATENT DOCUMENTS

| | | |
|---|---|---|
| FR | 698369 A | 1/1931 |
| GB | 520537 A | 4/1940 |

\* cited by examiner

FASTENER ARRANGEMENT

TECHNICAL FIELD

The present invention relates to a fastener arrangement and a method for manufacturing thereof according to the preambles of the independent claims.

BACKGROUND ART

Fasteners are hardware devices for mechanically joining two or more objects together. A huge variety of fasteners exist, wherein depending on their application, fasteners can occur as individual parts or as assemblies of multiple parts. A nut is a type of such a part, which comprises a threaded hole and is used together with a mating bolt for fastening e.g. a stack of layers together. Commonly, such nut fasteners are used together with washers, which serve for distributing the compressive force generated by the fastener e.g. on the layers.

Such fasteners can e.g. be applied for assembling bus bars together. Bus bars are used for electrical power distribution in switchboards and distribution boards or whenever high current is transmitted from generators or transformers to electrical apparatuses, e.g. to electrical vehicles, charging stations, or wind turbines.

Joining bus bars together demands for fasteners, which are not only unsusceptible to temperature variations, due to the high temperatures they might be exposed to, but also can be fastened in a way, such that the bus bars themselves are not harmed. Therefore, the nuts of such a connection are commonly assembled together with a flat washer and a disc-spring as demonstrated in document U.S. Pat. No. 5,941,654. The flat washer thereby serves for distributing the compressive force of the nut to the underneath layer or object and the disc-spring serves for ensuring a defined compressive force even in case of substantial lengthening of the bolt due to thermal expansion or seatings in the bus bar. Even though such an assembly of the nut, the disc-spring, and the flat washer fulfils its intended purpose, it is complicated and time-consuming for mounting, since the parts must be arranged in the right order and direction before being fastened. In addition, care must be taken to assemble the nut with the appropriate washers in terms of size and material. In particular, if the nuts are mounted to places which are difficult to access, this assembly of the nut and the washers is prone to errors. The components of the assembly could drop off in the course of being mounted and thereby lead to damages or short-circuits, in particular in bus bar installations.

DISCLOSURE OF THE INVENTION

The problem to be solved by the present invention is therefore to provide a fastener arrangement, which overcomes the disadvantages of the state of the art.

This problem is solved by the subjects of the independent claims. Accordingly, a first aspect of the invention concerns a fastener arrangement, comprising a main body, a spring element and a bearing element. The main body comprises a driving head having a central bore with an inner thread opening out into a front face of the driving head. The central bore might be a through hole or a blind hole. The central bore of the driving head with the inner thread is intended for forming a threaded connection with a mating bolt. The driving head is adapted for positive engagement in both rotational directions around a central axis of the inner thread with a driving tool, for rotating the driving head around the central axis. In a preferred embodiment of the main body, the driving head has the form of a nut, in particular the form of a hexagonal nut, which can be rotated with a hexagonal wrench. The main body further comprises a collar, which axially protrudes from the front face of the driving head and which is coaxially arranged to the inner thread. Preferably, the collar has a tubular shape. Its largest diameter might be smaller than a smallest diameter of the driving head at the front face. The inner diameter of the collar might vary over its extension, wherein it would always be larger than the diameter of the inner thread of the central bore hole of the driving head. The collar can comprise a threaded bore, but preferably has a flat inner surface. Preferably, the collar and the driving head are designed out of one piece, but might also be formed by separate pieces. The collar axially protrudes through a central through hole of the spring element and into a central through hole of the bearing element. Preferably, the collar radially centres the spring element and the bearing element, such that an axis of the through hole of the spring element and an axis of the through hole of the bearing element are coaxially aligned to the axis of the inner thread of the driving head.

The spring element axially abuts against the front face of the driving head into which the central bore opens out. The central through hole of the spring element is coaxially arranged to the inner thread of the driving head. In a preferred embodiment of the invention, the spring element is a disc-spring. The spring element might also be of other type than disc-type, for example might be a coil spring. The spring element can comprise exactly one element, e.g. one disc-spring, or it can comprise several elements, e.g. multiple disc-springs.

The bearing element axially abuts against the spring element wherein its central through hole is coaxially arranged to the inner thread of the driving head. The bearing element in axial direction of the through hole is preferably thicker than the spring element in axial direction of the through hole in order to ensure that the bearing element stays flat even under full compression load. In a preferred embodiment of the invention, the bearing element has the form of a flat washer.

At the end of the collar of the main body facing away from the driving head, which end is positioned inside the through hole of the bearing element, the collar provides a locking section radially extending outwardly. This locking section engages into an undercut in the through hole of the bearing element in such a manner, that a positive locking in axial direction is established between the collar and the bearing element. For establishing a positive locking, the locking section preferably has the form of a radially outwardly extending flange or has the form of a flat disc with a through hole. In a further embodiment, the locking section comprises multiple segments, which are radially extending outwardly. Such segments can e.g. have the form of outwardly extending hooks or tooth. The undercut is preferably a circumferential recess in the inner surface of the through hole of the bearing element, such as a notch or an abrupt change in diameter of the through hole. The positive locking prevents a separation of the bearing element from the collar in the axial direction facing away from the driving head while an axial travel of the collar inside the through hole of the bearing element is permitted, for enabling a compression of the spring element, in particular for enabling a complete compression of the spring element, or in case of a spring element comprising several elements, at least of a part of these elements. Since the spring element and the bearing element are restricted to separate from the main body by means of the positive locking in an axial direction facing away from the driving head and by abutting against the driving head in axial direction facing against the driving head and by abutting against each other, the fastener assembly is ready to be mounted and no assembly failures can be made due to the pre-arrangement of the elements.

In a preferred embodiment, the driving head, the collar and the locking section are designed out of one piece. In another preferred embodiment, the driving head, the collar and/or the locking section can be formed out of separate pieces. The driving head, the collar and/or the locking section can be made out of the same material or out of different materials, wherein the materials are preferably selected from steel, stainless steel, aluminium, copper, and alloys thereof, like brass. The spring element is preferably made from a material having a high tensile strength, a high elastic limit, and a high dynamic fatigue resistance and is preferably selected from steel, spring steel, stainless steel, and spring bronze. If the spring element comprises multiple elements, they can be made out of the same material or out of different materials. The spring element can be mechanically zinc plated or zinc flake coated for prohibiting corrosion and/or hydrogen embrittlement. The bearing element is preferably made from a material selected from steel, stainless steel, aluminium, copper, and alloys thereof, like brass. The bearing element is preferably electrically plated or zinc flake coated, for prohibiting corrosion.

The fastener arrangement is preferably used together with the mating bolt, wherein two or more objects can be fastened together by tightening the fastener arrangement and the mating bolt. An end of the mating bolt, which comprises an external thread mating with the inner thread of the main body, may thereby pass through through holes in the objects and through the through holes in the bearing element, the spring element, and into the inner thread of the driving head. By rotating the driving head, the fastener arrangement and the mating bolt are tightened together. In an unloaded state, the spring element might be already pre-compressed, e.g. by adjusting the possible travel on the collar, to minimize the number of rotations which are required to tighten the fastener arrangement. As long as the bearing element, which is directed towards a surface area of the objects, does not touch the surface, no compressive force is applied to the object by the fastener arrangement and the fastener arrangement is in an unloaded condition. If the driving head is rotated in a direction which results in tightening of the fastener arrangement and the bolt, the bearing element is getting in touch with the surface of the outermost object and applies a compressive force onto this surface which gradually increases while the spring element is getting increasingly compressed. Typically, the driving head is further rotated around the threaded bolt until the spring element is completely compressed, which means in particular, that the spring element is completely flattened. This condition relates to a fully loaded state of the fastener arrangement. When this state is reached, the tightening torque increases sharply, thereby indicating a proper bolt tensioning (without the need of a torque wrench). If the spring element is e.g. a disc-spring, it will be completely flattened out when such sharp increase in torque is reached, such that it works like a flat washer. Therefore, for properly tightening the fastener arrangement and the mating bolt, the driving head is preferably rotated until a defined tightening torque is reached or very preferably is rotated until said sharp increase in torque occurs. In the last mentioned case, the disc-spring defines the maximal tightening torque, which is the torque necessary to completely compress, in particular completely flatten, the disc-spring.

In a preferred embodiment, a distance between the end of the locking section facing away from the driving head and an end of the bearing element facing away from the driving head in an unloaded state of the fastener arrangement is greater than a stroke of the spring element. The stroke is thereby relating to the range of deflection which the spring element can experience between the unloaded state and the loaded state of the fastener arrangement.

In a further preferred embodiment, the spring element and/or the bearing element are rotatable relative to the collar. This is in particular important if the fastener arrangement is tightened to the bolt by rotating the driving head. Since the bearing element can rotate freely, damages to the objects caused by the rotating driving head are prevented, e.g. scratching of the surface of the outermost object by a rotating bearing element.

A further aspect of the present invention relates to a method for fabricating the above described fastener arrangement. The method comprises the steps of providing a driving head with a collar and mounting the spring element and the bearing element to the collar. The spring element is mounted such that the collar extends through the through hole of the spring element and the spring element axially abuts against the front face of the driving head into which the central bore opens out. The bearing element is mounted such that the end of the collar facing away from the driving head is protruding inside the through hole of the bearing element and the bearing element axially abuts against the spring element. A further step is the establishment of the positive locking between the collar and the bearing element by means of the locking section provided by the collar which engages into the undercut.

In a preferred method, the sequence of the method steps is such that the locking section is established after mounting the spring element and the bearing element onto the collar. The locking section is established such that it engages into the undercut in the through hole of the bearing element for establishing the positive locking. Preferably, such locking section is established by deforming the end of the collar.

In another embodiment, the locking section might be established by fastening a locking element, in particular a form of a cap, to the end of the collar facing away from the driving head. Such a locking element can have a flange or a part which radially extends outwardly. Preferably, the locking element is fixed to the end of the collar facing away from the driving head, such that it cannot move in any axial direction.

In still another preferred method, the locking section at the end of the collar facing away from the driving head is established before the spring element and the bearing element are mounted. In such an embodiment, the locking section could comprise flexible locking elements, which are preferably hook-shaped spring fingers. The flexible locking element can flex radially inwards when the spring element and the bearing element are mounted. When the bearing element is in the intended position relative to the collar, the flexible locking elements can snap into the undercut in the through hole of the bearing element for establishing the positive locking.

It is understood that the various embodiments, preferences, and method steps as disclosed in the specification may be combined at will, if not otherwise specified or explicitly excluded. Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

Figure 1:
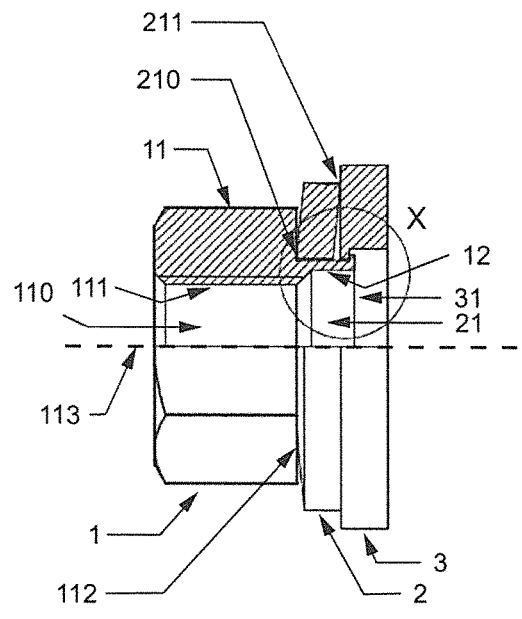
FIG. 1 shows a side-view with a partial sectional view of a preferred embodiment of the fastener arrangement in accordance with the invention.

FIG. 1 shows a schematic side view of a preferred embodiment of the fastener arrangement according to the invention in an unloaded state. The upper half of the fastener arrangement is shown in a sectional view. The embodiment comprises a main body 1 having a driving head 11 and a collar 12. The driving head 11 has a central through bore 110 with an inner thread 111 opening out into a front face 112 of the driving head 11. The driving head 11 has the form of a hexagonal nut and can be rotated with a hexagonal wrench. The collar 12 axially protrudes from the front face 112 of the driving head 11 being coaxially arranged to the inner thread 111. The driving head 11 and the collar 12 are designed out of one piece. The collar 12 axially protrudes through a through hole 21 of a spring element 2 and into a through hole 31 of a bearing element 3, wherein the through hole 21 of the spring element 2 and the through hole 31 of the bearing element 3 are coaxially arranged to the central axis 113 of the inner thread 111 of the driving head 11. The spring element 2 is axially abutting against the front face 112 of the driving head 11 and the bearing element 3 is axially abutting against the spring element 2. The spring element 2 is a disc-spring having the form of a washer. In the depicted unloaded state of the fastener arrangement, the spring element 2 abuts on one side with an edge 210, which is surrounding the through hole of the spring element 2, against the front face 112 of the driving head 11. On the other side, the spring element 2 abuts with another edge 211, which is defining its outer circumference, against the bearing element 3. The bearing element 3 has the form of a flat washer with an undercut 311 in the through hole 31 of the bearing element 3 formed by an abrupt change in the diameter of the through hole 31, such that the inner diameter at the end of the bearing element 3 facing towards the spring element 2 is smaller than at the end facing away from the spring element 2. An end of the collar 12 facing away from the driving head 11 is positioned inside the bearing element 3, where it provides a locking section 13 which engages into the undercut 311 in such a manner, that a positive locking in axial direction is established between the collar 12 and the bearing element 3. The positive locking prevents a separation of the bearing element 3 from the collar 12 in the axial direction facing away from the driving head 11.

Figure 2:
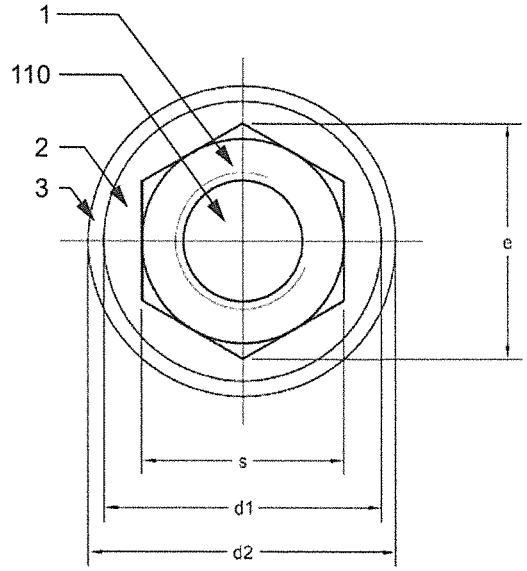
FIG. 2 shows a front view of the fastener arrangement in accordance with the embodiment of the invention of FIG. 1.

FIG. 2 shows a front view of the fastener arrangement comprising the main body 1 with the driving head 11 having the central bore 110, the spring element 2 and the bearing element 3. Due to its hexagonal form, the driving head has a minimal outer diameter s and a maximal outer diameter e. The main body 1, the spring element 2, and the driving element 3 are coaxially aligned to the central axis 113 of the central bore 110. The outer diameter d2 of the bearing element 3 is thereby larger than the outer diameter d1 of the spring element 2, which is again larger than the maximal outer diameter e of the driving head 11.

Figure 3:
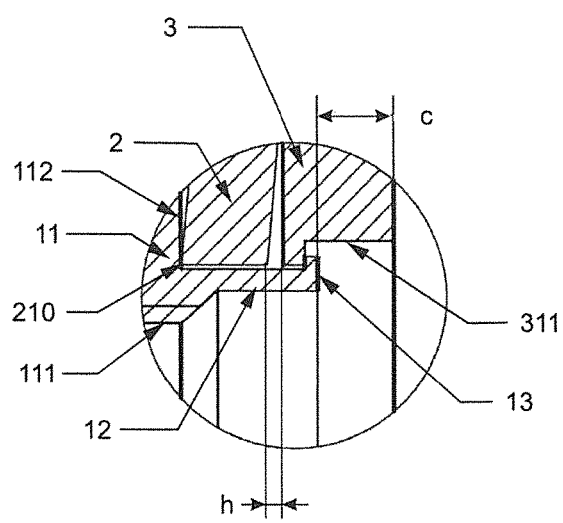
FIG. 3 shows an enlarged view of detail X from FIG. 1.

FIG. 3 shows the detail X from FIG. 1. The end of the driving head 11 facing the collar 12 is shown, with the collar 12 extending from the front face 112 of the driving head 11. The collar 12 extends through the through hole 21 of the spring element 2 and into the through hole 31 of the bearing element 3, where it forms a locking section 13 at its end facing away from the front face 112 of the driving head 11 engaging into the undercut 311 of the bearing element 3. In the area, where the collar 12 merges with the driving head 11, the inner diameter of the collar 12 gradually decreases thereby forming a leading-in chamfer towards the inner thread 111 of the driving head 11. A maximum stroke which the spring element 2 can perform between the shown unloaded state and a completely compressed situation, which relates to a completely loaded state, is a distance h. A distance c from the face of the locking section 13 facing away from the driving head 11 in axial direction to a face of the bearing element 3 facing away from driving head 11 in axial direction is larger than the distance h.

While there are shown and described presently preferred embodiments of the invention, it is to be distinctly understood that the invention is not limited thereto but may be otherwise variously embodied and practiced within the scope of the following claims.

The invention claimed is:
1. A fastener arrangement comprising:
a main body having
a driving head having a central bore with an inner thread opening out into a front face of the driving head, wherein the driving head is adapted for positive engagement in both rotational directions around a central axis of the inner thread with a driving tool, for rotating the driving head around the central axis, the central bore having a first diameter extending a longitudinal length;
a collar axially protruding from the front face of the driving head being coaxially arranged to the inner thread, the collar having a flat inner surface and a second diameter that is constant along a longitudinal length of the collar;
a spring element axially abutting against the front face of the driving head and having a central through hole which is coaxially arranged to the inner thread of the driving head; and
a bearing element axially abutting against the spring element and having a central through hole which is coaxially arranged to the inner thread of the driving head;
a leading-in chamfered region extending between the flat inner surface of the collar and the central bore of the driving head, the leading-in chamfered region having a gradual decrease in diameter from the collar to the driving head;
wherein the collar axially protrudes through the through hole of the spring element and into the through hole of the bearing element, and
wherein the collar at its end facing away from the driving head, which end is positioned inside the through hole of the bearing element, provides a locking section comprising a radially outwardly extending flange that radi- ally extends outwardly, which locking section engages into an undercut in the through hole of the bearing element in such a manner that a positive locking in axial direction is established between the collar and the bearing element which prevents a separation of the bearing element from the collar in the axial direction facing away from the driving head while an axial travel of the collar inside the through hole of the bearing element is permitted, for enabling a compression of the spring element, in particular for enabling a complete compression of the spring element, and wherein the first diameter is less than the second diameter.

2. The fastener arrangement according to claim 1, wherein at least one of the driving head, the collar, or the locking section of the main body are designed out of one piece.

3. The fastener arrangement according to claim 1, wherein the locking section has the form of an outwardly extending flat disc with a through hole, or wherein the locking section comprises multiple segments radially extending outwardly.

4. The fastener arrangement according to claim 1, wherein the spring element is a disc-spring.

5. The fastener arrangement according to claim 1, wherein the bearing element is a flat washer.

6. The fastener arrangement according to claim 1, wherein in the completely compressed state of the spring element, the bearing element in axial direction of the through hole is thicker than the spring element in axial direction of the through hole.

7. The fastener arrangement according to claim 1, wherein the collar radially centers the spring element and the bearing element, such that an axis of the through hole of the spring element and an axis of the through hole of the bearing element are coaxial with the central axis of the inner thread of the driving head.

8. The fastener arrangement according to claim 1, wherein the spring element and/or the bearing element are rotatable relative to the collar.

9. The fastener arrangement according to claim 1, wherein the bearing element is electroplated, in order to avoid corrosion, and/or wherein the spring element is mechanically plated, in order to avoid corrosion.

10. The fastener arrangement according to claim 1, wherein the spring element comprises exactly one element, or wherein the spring element comprises multiple elements.

11. The fastener arrangement according to claim 1, wherein a distance between an end of the collar facing away from the driving head and an end of the bearing element facing away from the driving head in an unloaded state of the fastener arrangement is greater than a stroke of the spring element.

12. The fastener arrangement according to claim 1, wherein at least one of the driving head, the collar, or the locking section of the main body are formed out of separate pieces.

13. The fastener arrangement according to claim 1, wherein at least one of the driving head, the collar, or the locking section of the main body are made out of one material selected from steel, stainless steel, aluminum, copper, brass, and alloys thereof.

14. The fastener arrangement according to claim 1, wherein at least one of the driving head, the collar, or the locking section of the main body are formed out of different materials selected from the group of steel, stainless steel, aluminum, copper, brass and alloys thereof.

15. The fastener arrangement according to claim 1, wherein the driving head and the collar are formed out of one piece.

* * * * *